Jan. 22, 1935. R. W. CANFIELD 1,988,783
APPARATUS FOR CIRCULATING MOLTEN GLASS
Filed June 27, 1930 2 Sheets-Sheet 2
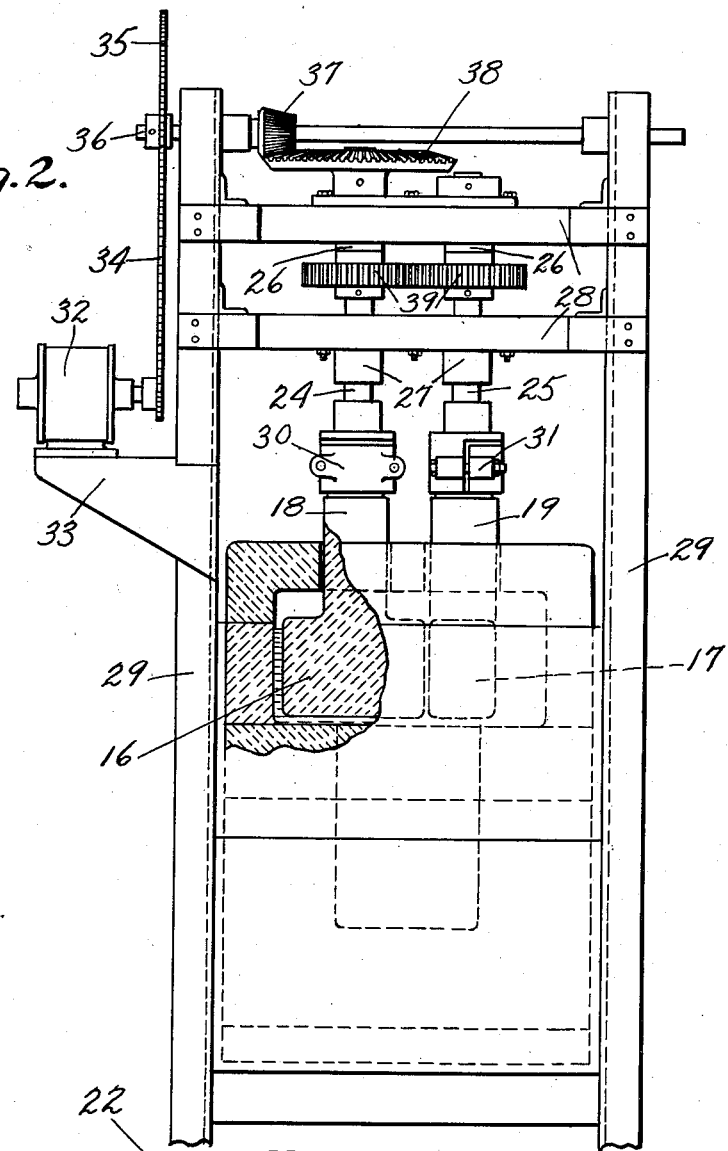
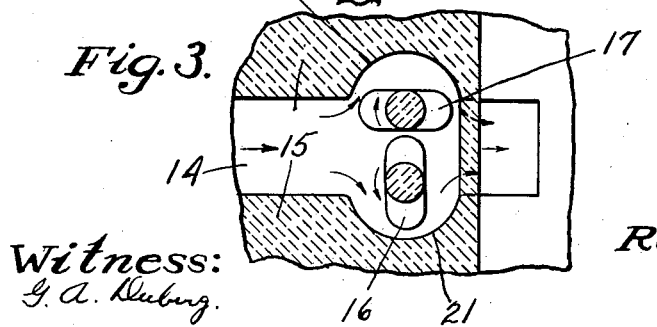
Inventor;
Robert W. Canfield
by Bjorn Parlan
Attorneys.
Witness:
G. A. Duburg.

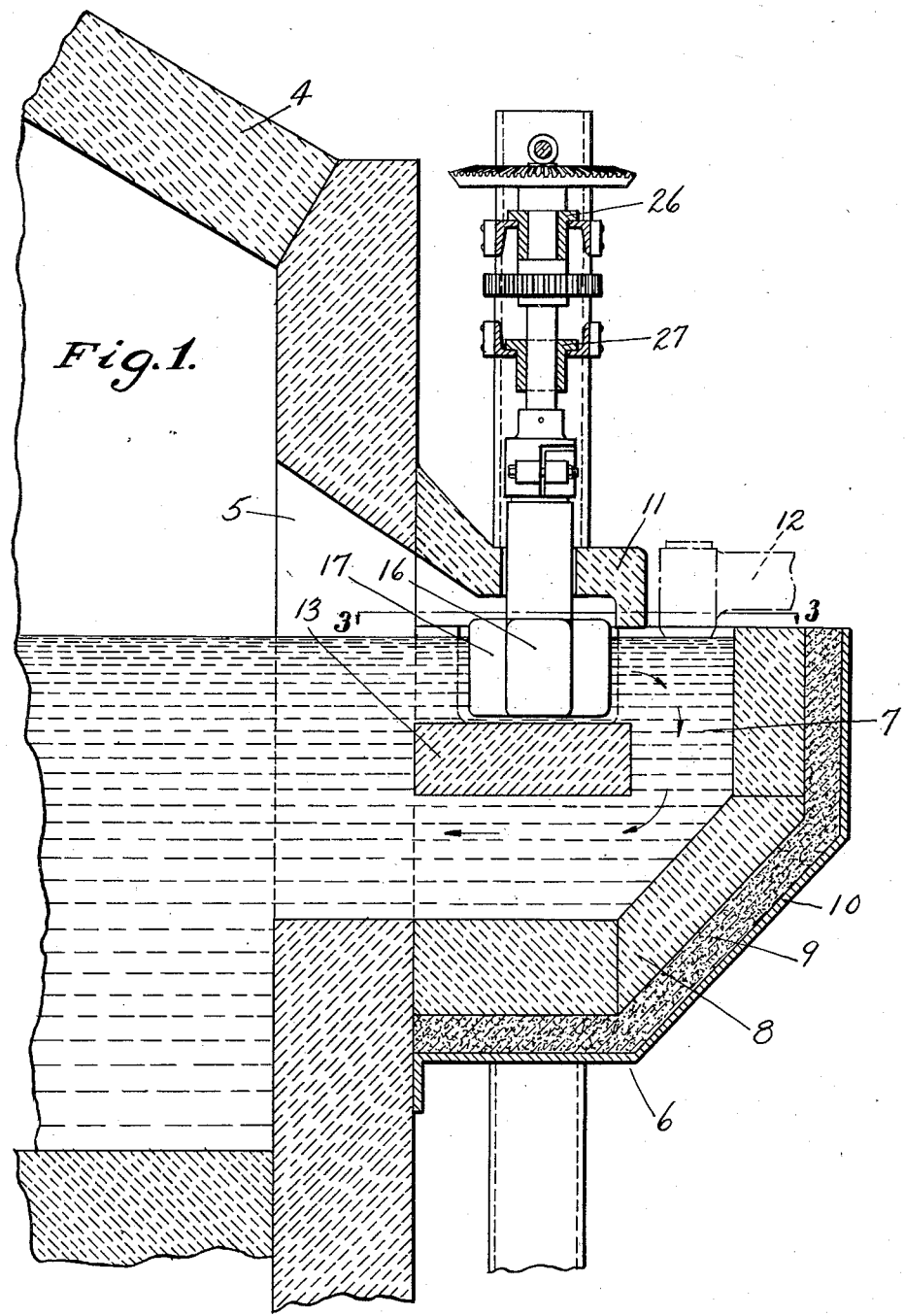

Patented Jan. 22, 1935

1,988,783

UNITED STATES PATENT OFFICE 1,988,783

APPARATUS FOR CIRCULATING MOLTEN GLASS

Robert W. Canfield, West Hartford, Conn., assignor to Hartford-Empire Company, Hartford, Conn., a corporation of Delaware Application June 27, 1930, Serial No. 464,173

3 Claims. (Cl. 49—56)

This invention relates to apparatus for circulating molten glass, particularly apparatus of the character in which a pool of molten glass is provided, from the surface of which charges are removed by suction, and the glass is circulated in order to remove chilled spots resulting from the contact of the molds with the glass, and the chilled bits produced by the severing operation, from the gathering zone.

In the supplying of molten glass by apparatus of the above character, the glass is apt to lose its required homogeneity and viscosity, if proper care is not taken to remove the chilled or cooled glass from the gathering zone and to replace it with hot homogeneous glass. It is an object of the present invention to provide novel apparatus for circulating molten glass in a gathering pool, by the employment of which the difficulty of maintaining a gathering pool of glass of good quality is largely overcome.

A more specific object of the invention is to provide novel glass supplying apparatus embodying means for circulating the glass, which is so constructed and arranged with respect to the container for the gathering pool that a strong current may be created in the glass, and which by its positive action insures that chilled glass produced in the gathering zone will be replaced by fresh homogeneous glass.

In order that the invention may be more clearly understood, and its several advantages appreciated, reference should be had to the accompanying drawings in which apparatus embodying the invention is shown.

In said drawings:

Figure 1 is a view in vertical section of a glass melting tank having an extension formed thereon for a gathering pool, and embodying the novel circulating means of the invention;

Fig. 2 is a view in front elevation of the construction shown in Fig. 1, a portion of the structure being broken away to show more clearly concealed portions of the apparatus; and Fig. 3 is a view in horizontal section of a fragmentary portion of the construction shown in Fig. 1, and taken on the line 3—3 of Fig. 1.

The construction as shown in the drawings comprises a glass melting tank, the front end portion of which is indicated at 4, and which has an opening 5 in the front wall thereof leading to an extension 6 for the gathering pool 7. The extension or container 6 may consist of a lining 8 of refractory material, backed by insulation 9, contained in a metal casing 10. The extension 6 is provided with a cover 11 which only partially covers the gathering pool 7, leaving a part thereof exposed to permit the molds of a suction machine, one of which molds is indicated diagrammatically at 12, to be dipped into the glass to gather charges therefrom by suction.

A horizontal refractory baffle or obstruction 13 preferably extends through the central portion of the gathering pool as shown, to define a channel through which the glass may be circulated. The glass from the melting tank proper flows into extension 6 through the opening 5 in the front wall of the tank, and through a channel 14 provided between refractory walls 15 and disposed above the baffle 13. See Fig. 3. The hot glass which flows through the channel 14, proceeds to the gathering zone, and thence downwardly through the lower portion of the pool around and beneath the baffle 13, thence back into the melting tank. Such circulation is facilitated by the differences in temperature of the glass at upper and lower levels, the hot glass flowing into the extension being lighter, and the chilled glass, produced by the contact of the mold of the gathering pool and by the gathering operation, being heavier and therefore causing a circulation of the glass in the direction shown approximately by the arrows in Fig. 1.

In order to positively insure circulation of the glass as above described, means preferably is provided for impelling the glass through the pool. In the construction shown, such means takes the form of a pair of vanes 16 and 17, supported in the channel 14 by their stems 18 and 19 which extend upwardly through openings 20 in the cover 11. The vanes may be so supported as to be almost completely immersed in the glass in said channel.

The vanes 16 and 17 are rotated about the vertical axes of their stems to draw hot glass from the glass in the melting tank, through channel 14, and to discharge such glass into the gathering zone. The mechanism for so rotating the vanes will be described hereinafter. The vanes preferably are positioned as close as possible so that as they are rotated, there will be only a very small space between them where they approach nearest each other. Thus, in the illustrated embodiment, the distance between the axes of rotation of the vanes is less than the maximum length of either of the vanes.

The vanes 16 and 17 cooperate respectively with opposed recesses 21 and 22, formed in the walls 15 of the channel 14, to force the glass around through said recesses into the gathering zone in the pool. Thus, the vanes are rotated in opposite directions, vane 16 being rotated counter-clockwise, to force the glass through the recess 21 with which it cooperates, and the vane 17 being rotated in a clockwise direction to force the glass through the recess 22.

Sufficient clearance is afforded between the vanes 16 and 17 and the recesses 21 and 22 to permit the glass to be forced through said recesses both by the direct impelling action of the vanes and by the glass adhering thereto. The vanes being relatively close together at all times, where they most nearly approach each other, there will be little if any tendency to reverse the flow of glass near the center of the channel 14, as will be understood. The directions in which the vanes are rotated, and the paths along which the glass flows through channel 14, and the recesses 21 and 22, are indicated approximately by the arrows in Fig. 3. But it will be obvious that the rotation of the vanes may be reversed, to cause the glass to flow opposite to the direction indicated by the arrows, if desired.

The vanes 16 and 17 serve not only to impart a strong circulation to the glass into the gathering zone, and from the gathering zone downwardly through the pool and rearwardly into the tank, but also to homogenize the glass as it flows through channel 14 toward the gathering zone.

The vanes may be operated intermittently, but preferably are operated continuously by mechanism which now will be described.

The vanes 16 and 17 are supported by vertical drive shafts 24 and 25 suitably journaled in vertically spaced bearings 26 and 27 mounted in transverse frame members 28 connected to vertical frame members 29 which arise along the sides of the extension 6. The shafts 24 and 25 terminate in clamps 30 and 31 which grip the upper ends of the stems 18 and 19 of the vanes.

The mechanism for rotating the vanes may comprise a motor 32 resting on, and secured to, a bracket 33 extending laterally from one of the side frame members 29, and serving to drive a chain 34 which engages a sprocket wheel 35 on horizontal shaft 36 suitably journaled in the tops of frame members 29. Shaft 36 carries a beveled pinion 37 on its inner end, in mesh with a bevel gear 38, secured to the upper end of the vertical shaft 24, previously referred to. To secure joint rotation of shafts 24 and 25 and of the vanes 16 and 17 supported thereby, said shafts have intermeshing gears 39 mounted thereon between the horizontal frame members 28, so that rotation of shaft 24 in a counterclockwise direction will cause rotation of shaft 25 in a clockwise direction, vanes 16 and 17 being correspondingly rotated.

Motor 32 being continuously driven, will operate through chain 34, shaft 36, pinion 37, bevel gear 38, and gear 39, to rotate the vanes 16 and 17 continuously in the desired directions. As a result, fresh homogeneous glass continuously is discharged into the gathering zone in the gathering pool, replacing previously chilled glass which is caused to flow downwardly through the gathering pool beneath the baffle 13 and rearwardly into the melting tank.

Although a specific construction embodying the invention has been shown in the drawings and described above, it is to be understood that various changes may be made in the details of construction thereof without departing from the scope of the appended claims.

Having thus described my invention what I desire to claim and secure by Letters Patent is:

1. In combination with a container for a pool of molten glass, a baffle extending through said container and submerged in said pool of glass, a pair of vanes at least partially immersed in the glass above said baffle, and means for rotating said vanes to positively circulate the glass in the pool around said baffle.

2. In combination with a glass melting tank, having an extension formed thereon for containing a pool of glass, a submerged baffle in said extension, a channel formed above said baffle, a pair of vanes at least partially immersed in the glass above said baffle and in said channel, said vanes being supported in adjoining relation to each other, opposed recesses formed in the walls of said channel, and means for rotating said vanes in opposite directions to draw glass from the tank inwardly through the channel and to impel said glass through the recesses in the walls of the channel and to discharge it into a gathering zone in the pool, in which charges of glass are gathered by suction.

3. In combination with the extension of a glass melting tank, for containing a pool of molten glass from the surface of which charges are removed by suction, a submerged baffle in said extension, a channel formed in said extension above said baffle, a cover for partially enclosing the glass in said extension, a pair of vanes at least partially immersed in the glass above said baffle, said vanes having stems formed thereon extending upwardly through said cover, and mechanism connected to the stems of said vanes for rotating said vanes in opposite directions to positively circulate the glass through said extension around said baffle.

ROBERT W. CANFIELD.